United States Patent
Muhammed et al.

(10) Patent No.: US 12,463,479 B2
(45) Date of Patent: Nov. 4, 2025

(54) PERMANENT MAGNET MOTOR FOR ELECTRICAL SUBMERSIBLE PUMP AND METHOD OF ASSEMBLY ROTOR

(71) Applicant: Baker Hughes Oilfield Operations LLC, Houston, TX (US)

(72) Inventors: Ameen Muhammed, Claremore, OK (US); James Christopher Clingman, Broken Arrow, OK (US); John Knapp, Tulsa, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 253 days.

(21) Appl. No.: 17/957,779

(22) Filed: Sep. 30, 2022

(65) Prior Publication Data

US 2023/0109040 A1    Apr. 6, 2023

Related U.S. Application Data

(60) Provisional application No. 63/251,376, filed on Oct. 1, 2021.

(51) Int. Cl.
*H02K 1/27* (2022.01)
*F04D 13/08* (2006.01)
(Continued)

(52) U.S. Cl.
CPC ........... *H02K 1/278* (2013.01); *F04D 13/086* (2013.01); *H02K 1/16* (2013.01); *H02K 1/28* (2013.01); *H02K 15/03* (2013.01)

(58) Field of Classification Search
CPC ............ H02K 1/278; H02K 1/16; H02K 1/28; H02K 15/03; H02K 1/2783; F04D 13/086; F04D 13/021; F04D 13/10
See application file for complete search history.

(56) References Cited

U.S. PATENT DOCUMENTS

| | | | |
|---|---|---|---|
| 3,229,136 A | * | 1/1966 | Pannell ................. H02K 1/243 310/265 |
| 7,971,650 B2 | | 7/2011 | Yuratich et al. |

(Continued)

FOREIGN PATENT DOCUMENTS

CN    102148554    8/2011

OTHER PUBLICATIONS

International Search Report and Written Opinion for PCT Application No. PCT/US2022/045426 dated Jan. 18, 2023.

*Primary Examiner* — Thomas Truong
(74) *Attorney, Agent, or Firm* — Baker Hughes Company

(57) ABSTRACT

A motor for an electrical submersible pump includes a stator and rotor, where the rotor is made up of adjacent columns of magnets affixed onto an annular core. End rings on opposite ends of the core provide axial backstops for magnet columns. Thin coaxial sleeves are shrunk fit over the magnets and end rings and that radially compress the magnets. Apertures in a column are formed radially through the core and receive fasteners for securing a guide bar to the core. The guide bar simulates an installed column of magnets to guide placement of adjacent columns of magnets as the guide bar width is substantially the same as a column of magnets, and aperture locations are strategically positioned so that when the guide bar is secured onto the core. After the guide bar is removed the one of the columns of magnets is then adhered to the core.

15 Claims, 6 Drawing Sheets

(51) Int. Cl.
*H02K 1/16* (2006.01)
*H02K 1/278* (2022.01)
*H02K 1/28* (2006.01)
*H02K 15/03* (2006.01)

(56) References Cited

U.S. PATENT DOCUMENTS

| | | | |
|---|---|---|---|
| 2007/0075596 A1* | 4/2007 | Hall | H02K 1/32 |
| | | | 310/61 |
| 2008/0143207 A1* | 6/2008 | Shah | H02K 21/16 |
| | | | 310/156.08 |
| 2008/0284264 A1 | 11/2008 | Yuratich et al. | |
| 2010/0019600 A1* | 1/2010 | Saban | H02K 5/1285 |
| | | | 310/156.28 |
| 2015/0008780 A1* | 1/2015 | Reeves | F16C 41/004 |
| | | | 310/90 |
| 2015/0188384 A1* | 7/2015 | Rumbaugh | H02K 5/167 |
| | | | 310/90 |
| 2019/0006895 A1 | 1/2019 | Sim | |
| 2020/0304002 A1* | 9/2020 | Amjad | E21B 43/128 |

\* cited by examiner

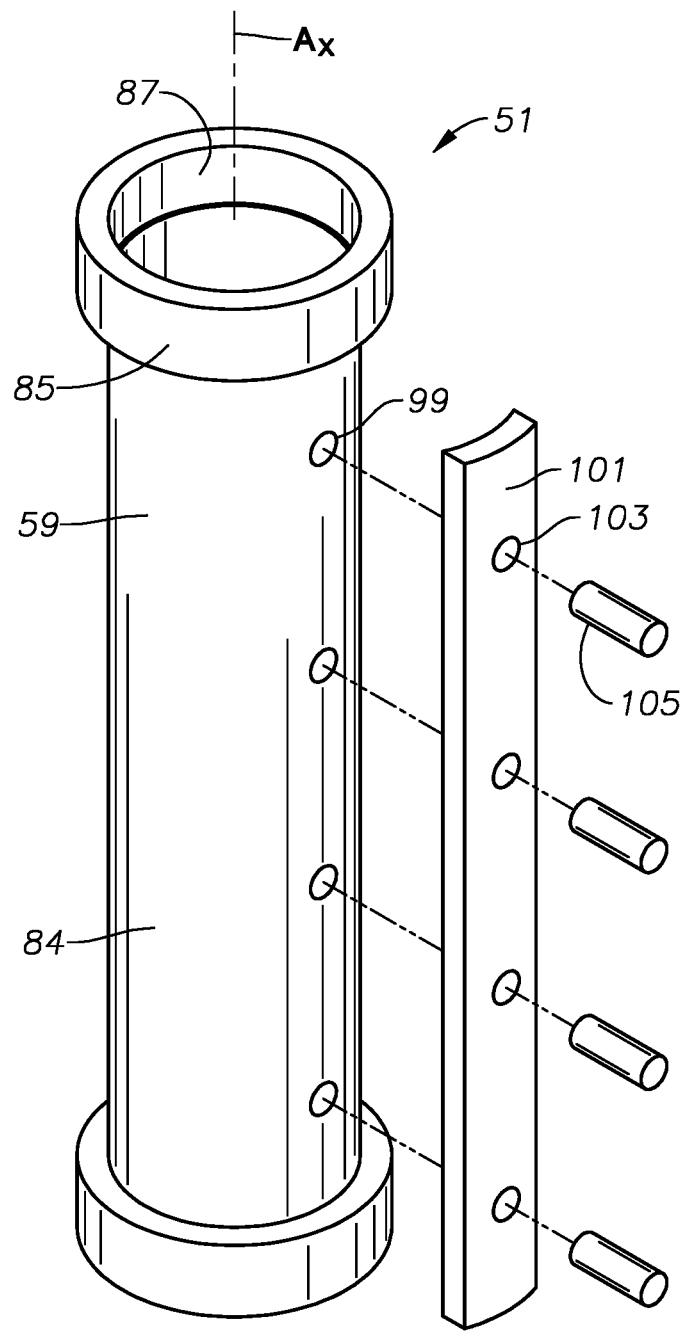
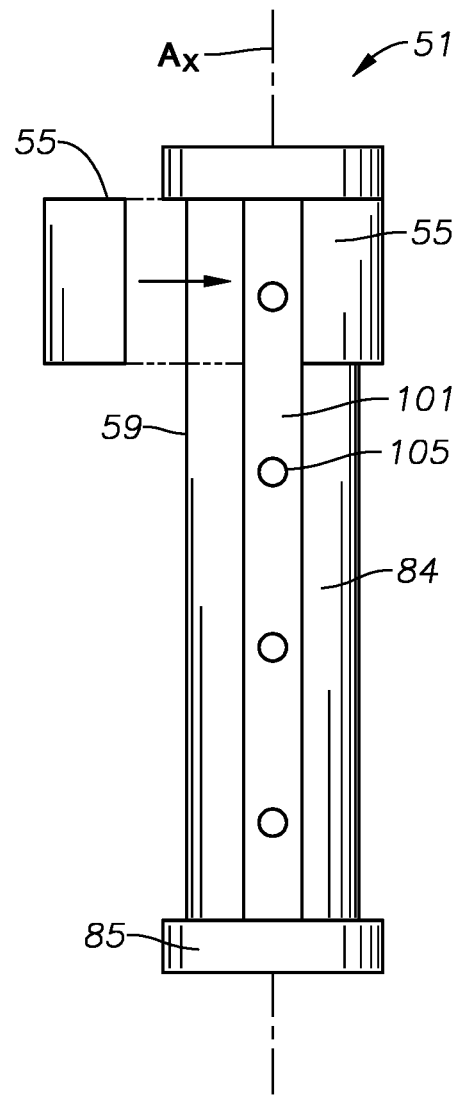
FIG. 9
FIG. 10

PERMANENT MAGNET MOTOR FOR ELECTRICAL SUBMERSIBLE PUMP AND METHOD OF ASSEMBLY ROTOR

CROSS-REFERENCE TO RELATED APPLICATION

This application is a continuation in part of and claims priority to and the benefit of U.S. Provisional Application Ser. No. 63/251,376, filed Oct. 1, 2021, the full disclosure of which is incorporated by reference herein in its entirety and for all purposes.

BACKGROUND OF THE INVENTION

1. Field of Invention

This disclosure relates to electrical submersible pumps (ESP), and in particular to the structural configuration of a permanent magnet ESP motor and method of assembling the rotor sections.

2. Description of Prior Art

ESPs are often used to pump well fluid from hydrocarbon wells. One common type of motor for an ESP is an induction electric motor having stator windings encircling a rotor mounted to a drive shaft. The rotor has a stack of steel laminations with copper rods extending through them. Three-phase power applied to the stator windings induces rotation of the rotor.

Another type uses permanent magnets in the rotor, each providing one pole of the motor, which may have two, four or a different number of poles. Each permanent magnet is an arcuate member having an inner side bonded or otherwise attached to a core sleeve mounted to the shaft for rotation and an outer side facing and spaced from the stator by a gap. Supplying power to windings in the stator causes the magnets to rotate the drive shaft. The rotor is made up of rotor sections separated by radial bearings.

ESP motors, including permanent magnet motors, typically operate at a maximum speed of 3600 RPM. There is interest in operating ESP motors and pumps at a much higher speed, such as 10,000 RPM or more. Balance at such high speed is critical to avoid vibration and shortening the life of the motor and pump.

SUMMARY OF THE INVENTION

Disclosed herein is an example of an electrical submersible pump motor that includes a stator having a stack of laminations with windings extending through slots in the laminations, the stator having a central opening with a longitudinal axis, a shaft extending through the central opening, and rotor sections mounted along a length of the shaft for rotating the shaft. In this example each of the rotor sections include a tubular core having a bore keyed to the shaft for rotation in unison, the bore having undercut sections at each end of the core separated by an intermediate bore section of smaller diameter than the undercut bore sections, the tubular core having an outer surface with an end ring section at each of the ends separated by an outer surface intermediate section, a pair of end rings, each of the end rings having an initial inner diameter greater than an outer diameter of the end ring sections and being shrunk fit onto one of the end ring sections, and an array of magnets mounted to the outer surface intermediate section between the end rings. In this example, the outer diameter of each of the end ring sections is smaller than an outer diameter of the outer surface intermediate section, and optionally the diameter of each of the undercut bore sections decreases from an initial diameter to a final diameter when the end rings are shrunk fit onto the end sections; and the final diameter is not less than the diameter of the intermediate bore section. An axial dimension of each of the undercut sections is optionally the same as an axial dimension of each of the end ring sections. In an alternative, the motor further includes first and second outer sleeves that enclose the array of magnets and have lengths less than a length of the array of magnets, and where the outer sleeves are made of titanium. In an embodiment, the shaft and the core are formed of a magnetic steel. In one example a ratio of a length of each of the rotors divided by a diameter of the shaft is not greater than 12. Further optionally included is an axially extending groove in the central opening, and a bearing located between adjacent ends of two of the rotor sections, the bearing having a rib integrally formed thereon and that projects radially outward into the groove, so that the bearing is rotationally coupled with the stator.

Another example of an electrical submersible pump motor is disclosed and that includes a stator having windings, a shaft extending through an axial opening in the stator, and a rotor that is disposed inside the axial opening. In this example the rotor includes an axial bore that receives the shaft, an annular core, magnets strategically arranged on the core, and coaxially disposed sleeves circumscribing and shrunk fit around the magnets so that the magnets are radially compressed between the core and the sleeves. In an embodiment, the sleeves have a combined axial length that is about the same as an axial length of the magnets. The sleeves optionally have a coefficient of thermal expansion that is substantially the same as that of the magnets. In an alternative, the motor further includes end rings that are shrunk fit onto opposing outer ends of the core and undercuts defined by an increase in diameter of the axial bore at the opposing ends, so that when the end rings are shrunk fit onto the core, an inner wall of the core remains spaced away from the shaft. Embodiments include a bearing coupled with an inner surface of the stator by an integrally formed rib that projects radially outward into a groove formed axially along the stator inner surface. Examples also include lubricant flow passages formed axially and axially in the bearing. The motor can include an elongated guide bar having a width that is substantially the same as a width of a row of magnets that extend axially along the core, the guide bar selectively mounted onto the core during assembly of the core for placement of another row of magnets that are arranged adjacent to the row of magnets. The motor shaft optionally includes material that is magnetic.

A method of forming an electrical submersible pump motor is disclosed and that includes obtaining a rotor section, where the rotor section is made up of a core with an axial bore that defines a core inner surface and a key slot extending axially along the core inner surface, an end ring at an end of the core and on an outer surface of the core, columns of magnets mounted to the outer surface, an outer sleeve enclosing the magnets, a column of apertures formed radially through the core and at strategic locations designated for placement of magnets to be mounted on the core. In this example the rotor section formed by obtaining an elongated guide member having a width substantially the same as that of a width of one of the rows of magnets, securing the guide member to the outer surface with fasteners that insert into the apertures, mounting first and second rows of magnets to the core by abutting side edges of magnets of the first and second rows to opposing side edge of the guide member, adhesively adhering the magnets of the first and second rows, removing the guide member, leaving an open space on the outer surface bounded on opposite circumferential sides by magnets previously installed, then adhering a third column of the magnets to the outer surface of the core in the open space, repeating these steps until the magnets fully circumscribe a portion of the core; and combining the rotor section with a stator section. In an alternative, a first one of the end rings is added to the core prior to adding the guide bar, and then after all magnets are applied to the core, a second end ring is added to the core on an end opposite the first end ring. Further in this alternative, first and second outer sleeves are slid over the end rings and the magnets that are then heat shrunk. The column of apertures are optionally at a selected angular distance relative to the key slot. In examples, the columns of magnets are made up of alternate columns of pole magnets and orthogonal magnets, and wherein the width of the guide bar is substantially equal to one of a column of pole magnets or a column of orthogonal magnets.

BRIEF DESCRIPTION OF DRAWINGS

Some of the features and benefits of the present invention having been stated, others will become apparent as the description proceeds when taken in conjunction with the accompanying drawings, in which:

FIG. 9 is an exploded isometric view of the rotor section of FIG. 5 being assembled.

FIG. 10 is a side view of the rotor section of FIG. 9, showing another step in the assembly.

Figure 1:
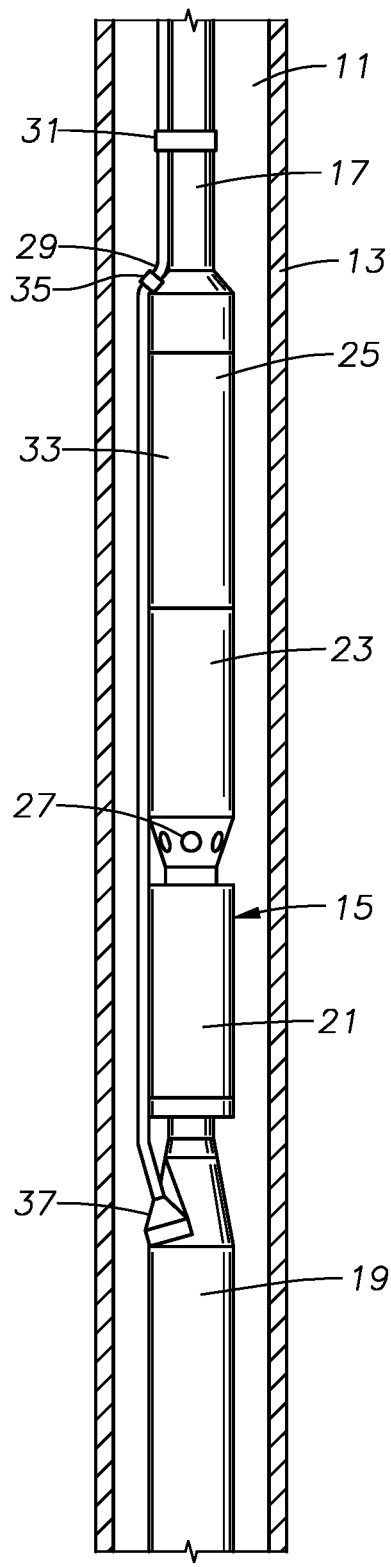
FIG. 1 is a schematic side view of an example of an ESP in accordance with this disclosure.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, shown in an elevational partial sectional view is a well 11 with casing 13 that is perforated or has other openings to admit well fluid. An electrical submersible pump assembly or ESP 15 is illustrated as being supported on production tubing 17 extending into well 11. In alternatives ESP 15 is supported by coiled tubing or another structure. Although shown installed vertically, embodiments exist in which ESP 15 is located within an inclined or horizontal section of well 11. The terms "upper", "lower" and the like as used herein only for convenience. In the example shown ESP 15 has several modules, including a motor 19, which is a three-phase permanent magnet motor in this embodiment. A motor protector or seal section 21 connects to motor 19 and has components, such as a bladder, for reducing a pressure differential between lubricant in motor 19 and the hydrostatic pressure of well fluid. Seal section 21 is shown mounted to an upper end of motor 19 and is alternatively mounted to a lower end. An optional gas separator 23 connects to the upper end of seal section 21 in this example.

A pump 25 connects to gas separator 23 as shown, in some alternatives without a gas separator, pump 25 alternatively connects to seal section 21. In this example a well fluid intake 27, which provides an inlet for fluid to flow to pump 25, is shown formed in gas separator 23; intake 27 is alternatively formed on pump 25, such as in embodiments without a gas separator. Examples of pump 25 include a rotary pump, such as a centrifugal pump, as well as other types of pumps. The connections between the modules of ESP 15 are shown as bolted flanges, and optionally are threaded connections.

Still referring to FIG. 1, a power cable 29 is shown extending from a wellhead (not shown) alongside tubing 17 for supplying power to motor 19. Spaced apart clamps 31 (only one shown) secure power cable 29 to production tubing 17. A motor lead 33, which may be considered to be a lower part of power cable 29, connects to a lower end of power cable 29 by a splice 35 in this example. Motor lead 33 extends alongside ESP 15 and has an electrical connector 37 on its lower end that secures to a receptacle at the upper end of motor 19. Splice 35 is illustrated at the upper end of pump 25, and in alternatives is a considerable distance above pump 25.

Figure 2:
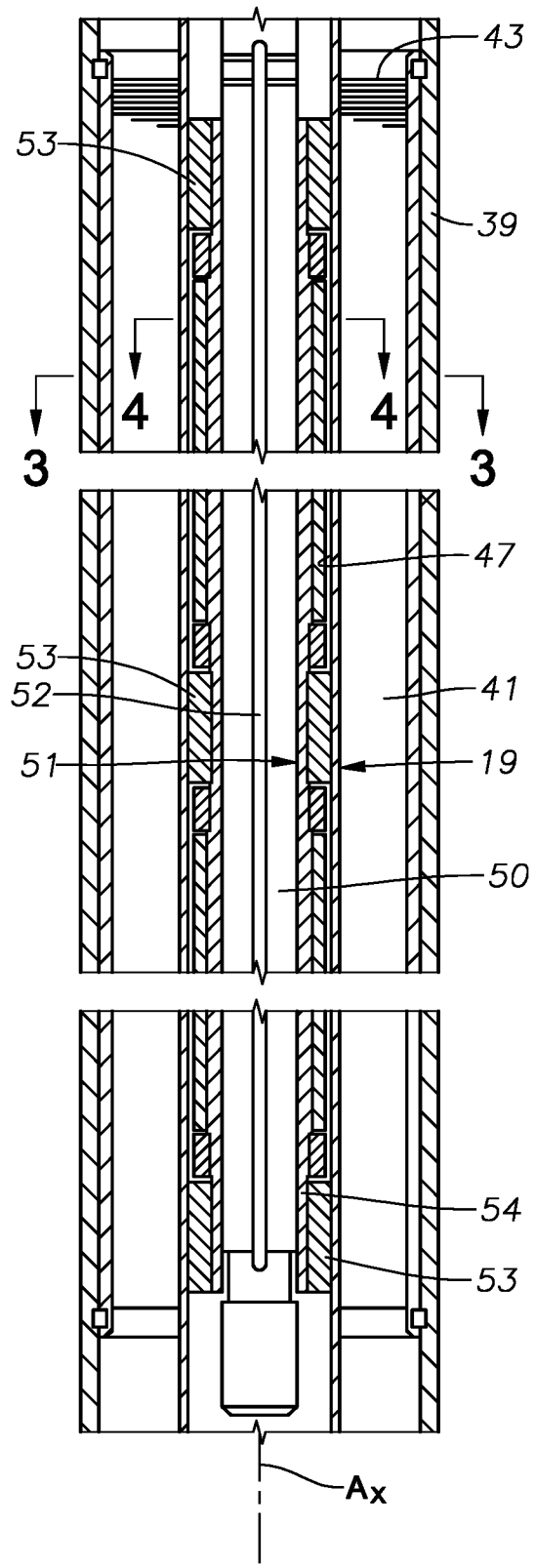
FIG. 2 is an axial sectional view of a portion of the motor of the ESP in FIG. 1.
Figure 3:
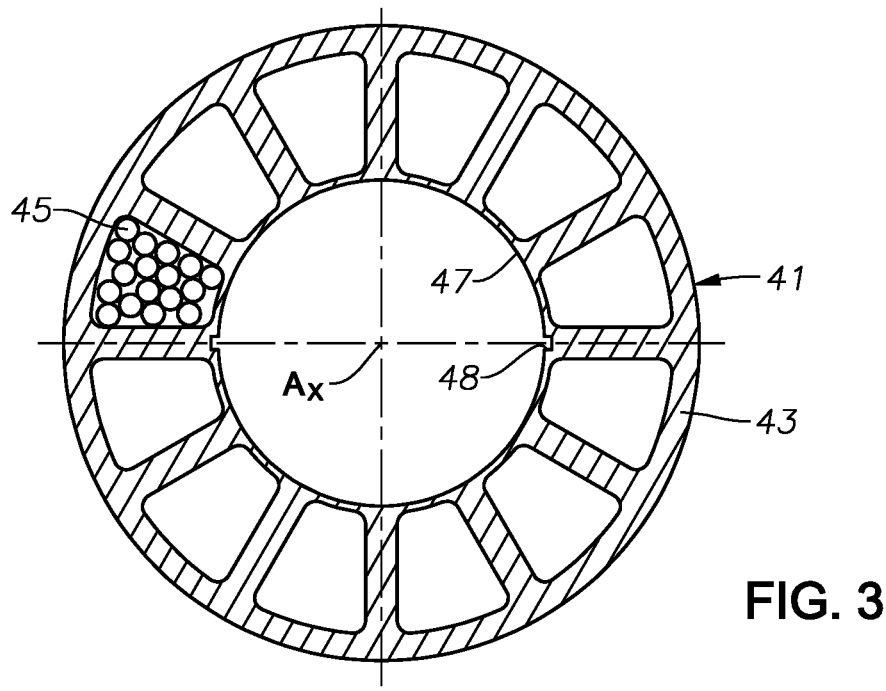
FIG. 3 is a transverse sectional view of the stator of the motor taken along the line 3-3 of FIG. 2, and with the housing, shaft and rotor not shown.

Referring to FIG. 2, motor 19 is shown with a housing 39 containing a non-rotating stator 41 that in this example is conventional and has a stack of thin steel discs or laminations 43 (only a few shown). Windings 45 (FIG. 3) extend through slots in laminations 43. Stator 41 has a cylindrical central opening 47 with a longitudinal axis $A_x$. Two axially extending grooves 48 extend down the sidewall of stator central opening 47. Grooves 48 are shown spaced 180 degrees apart from each other and are optionally spaced apart at different angles. A rotatable drive shaft 50 extends through bore 47 on axis $A_x$ for driving pump 25 (FIG. 1). In examples shaft 50 is formed of a magnetic steel alloy.

A number of rotor sections 51 form an elongate cylindrically shaped rotor that is shown mounted to shaft 50 by a key 52 for causing shaft 50 to rotate. Rotor sections 51 are positioned along the length of shaft 50 and spaced axially apart from each other a short distance. In examples, each rotor section 51 has a short length, such 9 inches or less, to reduce vibration. In this embodiment, a ratio of the length of each rotor section 51 over the diameter of shaft 50 is 12 or less. In an example shaft 50 diameter is about 0.75 inch and motor 19 has an overall length of about 12.5 feet, resulting in about 12 rotor sections 51.

Still referring to FIG. 2, radial bearings 53 are shown located between opposing ends of adjacent rotor sections 51 and also at the top and bottom of the rotor. Bearings 53 engage stator 41 to prevent rotation and stabilize shaft 50. In this example, each bearing 53 has an inner diameter that slides on a bronze sleeve 54 that is engaged by key 52 to rotate with shaft 50.

Figure 4:
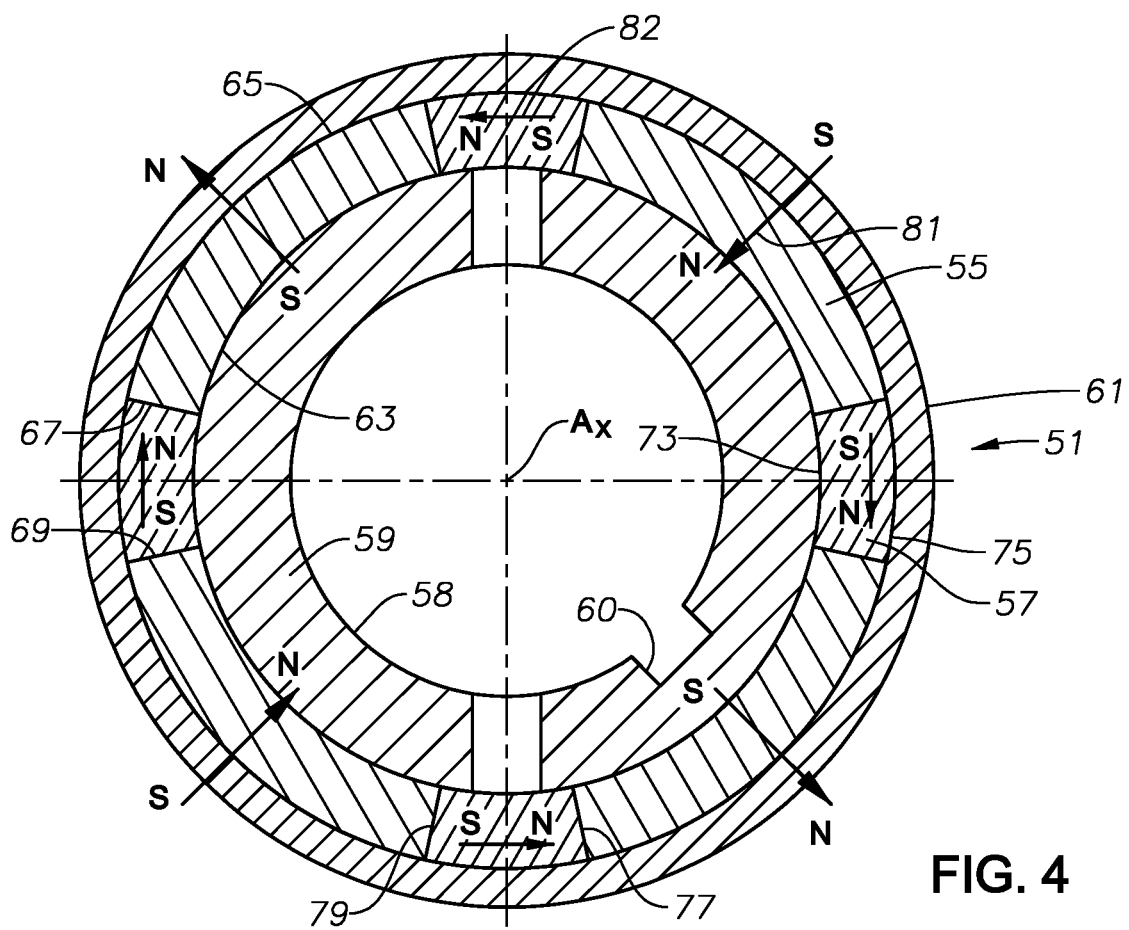
FIG. 4 is a schematic sectional view of the rotor of the motor taken along the line 4-4 of FIG. 2, and with the housing, shaft and stator not shown.

Referring to FIG. 4, each rotor section 51 has a number of permanent pole or radial magnets 55 mounted circumferentially around shaft 50. In this example, there are four pole magnets 55, but other numbers are feasible, such as two, six or other numbers. In this embodiment, there are also four orthogonal or circumferential magnets 57, each located between two adjacent pole magnets 55. Pole magnets 55 and orthogonal magnets 57 are shown mounted to the outer surface of an inner sleeve or tubular core 59. In examples, core 59 is formed of a magnetic steel alloy and has a bore 58 with at least one key slot 60 for receiving shaft key 52 (FIG. 2) for rotating shaft 50. Pole magnets 55 and orthogonal magnets 57 are attachable to inner sleeve 59 in various manners, such as by epoxy or an adhesive in a method to be explained subsequently.

An outer sleeve 61 encloses the array of magnets 55, 57 and rotates with each rotor section 51. Outer sleeve 61 is non-magnetic and in this embodiment, it is formed from titanium. Outer sleeve 61 has a coefficient of thermal expansion (CTE) that is the same or similar to the CTE of the material of magnets 55, 57. Also, in this embodiment, outer sleeve 61 is formed of two thin sleeves 61a, 61b that are arranged axially adjacent one another, and each having a length along axis $A_x$ (an axial length) that is less than an axial length of magnets 55, 57. An embodiment with sleeves of a reduced axial length (over that of sleeve 61) are easier to shrink fit over the array of magnets and provides an advantage during assembly of the rotor 51 (FIG. 4). In alternatives, more than two shrink fit sleeves are employed.

Each pole magnet 55 is shown having an arcuate inner side 63 facing towards axis $A_x$ and an arcuate outer side 65 facing away from axis $A_x$, and each side 63, 65 has a radius with a center point on axis $A_x$. Each pole magnet 55 has circumferential ends or side edges 67, 69 that join and extend between inner and outer sides 63, 65. In this embodiment, each side edge 67, 69 is flat and located on a radial plane of axis $A_x$. In the example shown, the circumferential length between side edges 67, 69 is the same for each of the pole magnets 55 and is illustrated to be equivalent to about 70 degrees; in alternatives this circumferential length varies.

Each pole magnet 55 has a south pole on one of its inner and outer sides 63, 65 and a north pole on the opposite side. The south and north poles are indicated by the letters "S" and "N" in FIG. 4. An example of a four-pole design is shown in FIG. 4, in which orientation of the north and south poles N, S alternate between adjacent pole magnets 55. Two of the pole magnets 55 have the south pole S on the inner side 63 and two on the outer side 65. The two pole magnets 55 with the south pole S on the inner sides 63 are 180 mechanical degrees from each other. Similarly, the two pole magnets 55 with the south pole S on the outer sides 65 are 180 degrees from each other.

Orthogonal magnets 57 are also curved, having arcuate inner sides 73 and arcuate outer sides 75. Flat circumferential ends or side edges 77, 79 are located in radial planes of axis $A_x$ and join inner and outer sides 73, 75. Each orthogonal magnet 57 has a radial width between inner and outer sides 73, 75 that is the same or substantially the same as pole magnets 55, resulting in a constant outer diameter for the array of magnets 55, 57. In the example shown the circumferential dimension of each orthogonal magnet 57 is about 20 degrees and less than the circumferential dimension of pole magnets 55.

Still referring to the illustrated example of FIG. 4, each orthogonal magnet 57 is polarized in an orthogonal manner with a south pole S on one side edge 77, 79 and a north pole N on the opposite side edge. Flux lines 81 emanating from each north and south pole N, S of magnets 55 are shown radial to axis $A_x$, and flux lines 82 emanating from each north and south pole N, S of magnets 57 are normal to the flat side edges 77, 79. This polarization creates a magnetic flux that curves in a circumferential direction, from one side edge 77, 79 through the opposite side edge 77, 79.

Each orthogonal magnet 57 has a polarity opposite to the orthogonal magnet 57 closest to it. Each orthogonal magnet 57 completely fills the space between adjacent ones of the pole magnets 55. Each orthogonal magnet side edges 77, 79 are flush with and abuts one of the pole magnet side edges 67, 69, creating a continuous annular shape for the magnetic array.

As shown, rotor sections 51 are assembled with the pole magnets 55 in each rotor section 51 in axial alignment with the pole magnets 55 in the other rotor sections 51. Similarly, the orthogonal magnets 57 in all of the rotor sections 51 are axially aligned. This alignment is achieved by securing each circumferential row of magnets 55, 57 in rotor sections 51 at the same angular distances from key slot 60. For example, if the two orthogonal magnets 57 closest to key slot 60 in one rotor section 51 are 45 degrees from key slot 60, orthogonal magnets 57 in the rest of the rotor sections 51 will be oriented the same.

Orthogonal magnets 57 optionally are of the same material as pole magnets 55, examples of which include a rare earth magnetic material. The same or similar material results in orthogonal magnets 57 having the same CTE as pole magnets 55, avoiding thermal stresses that occur as motor 19 heats.

Figure 5:
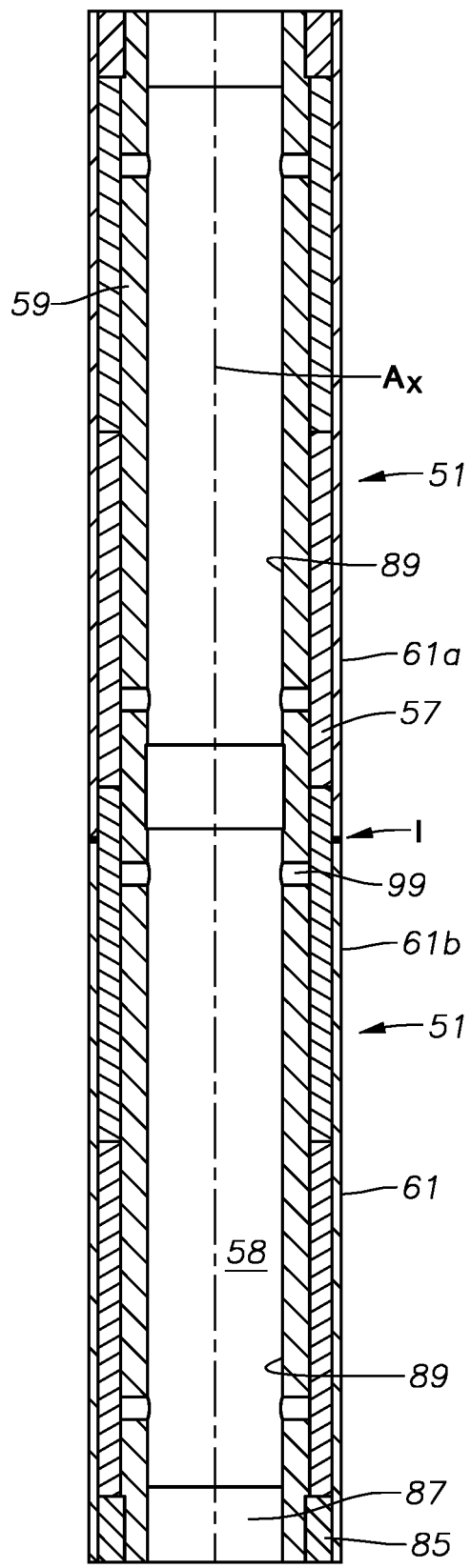
FIG. 5 is an axial sectional view of one of the rotor sections of the motor of FIG. 2, with the shaft and stator not shown.
Figure 6:
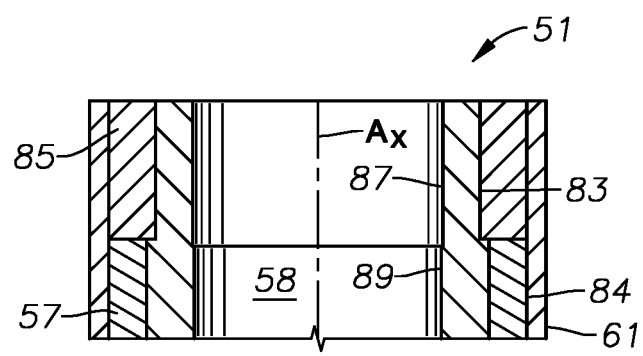
FIG. 6 is an enlarged sectional view of an upper portion of the rotor of FIG. 7.

FIGS. 5 and 6 illustrate one rotor section 51 in an axial sectional view and without shaft 50 (FIG. 2). Core 59 has an end ring shoulder 83 formed on circumferentially on each end. Each end ring shoulder 83 has a smaller outer diameter than the outer diameter of an intermediate outer surface section 84 between end ring shoulders 83. The interfaces between section 84 and each shoulder 83 defines radial surfaces on the outer surface of core 59 that face away from one another. An end ring 85 is shown circumscribing and coupled onto the end ring shoulders 83 by an interference fit in this embodiment. In this example, end ring 85 has an outer diameter that is substantially the same as the outer diameter of the array of magnets 55, 57 (FIG. 4). Sleeve 61 in this example is made up of sleeves 61a, 61b that are shown arranged in series and each having an axial length less than an axial length of sleeve 61. An interface I is defined between ends of sleeves 61a, 61b that are adjacent and oppositely facing.

An undercut section 87 is machined at each end of core 59 along its inner surface and that circumscribe core bore 58. In the example shown, each undercut section 87 has a slightly larger diameter than an intermediate portion 89 of bore 58 between undercut sections 87. In examples, an axial length of each undercut section 87 is the same as or greater than an axial length of each shoulder 83. Key groove 60 (FIG. 4) is formed in an inner surface of core 59 and that axially through undercut sections 87 and intermediate section 89.

In this embodiment, each end ring 85 has an initial inner diameter prior to installation that is smaller than the outer diameter of each end ring shoulder 83. In an example, an initial inner diameter defines an inner diameter of each end ring 85 when at an ambient temperature and/or a same temperature as core 59. End rings 85 are installed with a heat shrink process by heating them to a temperature greater than that of core 59 to cause the end rings 85 to expand, causing their inner diameters to be at an expanded diameter that sufficiently exceeds the outer diameters of the shoulders 83 by an amount so that end rings 85 can receive end ring shoulders 83 within. In examples, after heating the end rings 85 are contracted by being cooled, which in turn decreases their inner diameters back to their initial diameters and into compressive engagement with the outer surfaces of the end ring shoulders 83. In an example, the decrease of the diameter of the end rings 85 deforms each end ring shoulder 83 slightly inward, reducing the diameter of each undercut section 87; and the final diameter of each undercut section 87 is not less than the inner diameter of intermediate section 89 of core bore 58 between undercut end sections 87. A very small tolerance exists between shaft 50 (FIG. 2) and core bore 58 to reduce vibration. The tolerance is sufficient to insert each rotor section 51 over shaft 50 after end rings 85 have been installed.

Figure 7:
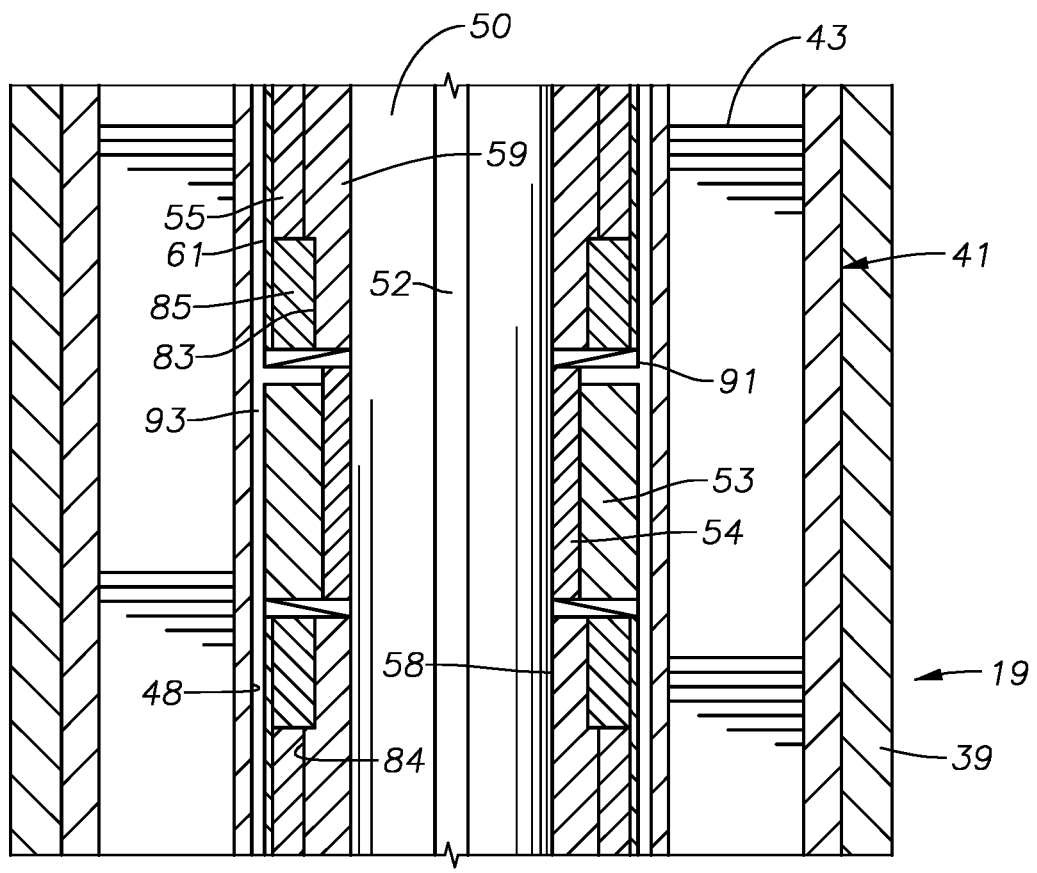
FIG. 7 is an enlarged axial sectional view of a portion of the rotor assembly of the motor of FIG. 2 illustrating a bearing.

Referring to FIG. 7, one of the bearings 53 fits between each of the rotor sections 51 and at opposite ends. Each bearing 53 is in sliding engagement with one of the bronze sleeves 54, which may be slighter longer in axial dimension than each bearing 53. Each bearing assembly includes two thrust washers 91. Each thrust washer 91 has one side in abutment with an end of one of the rotor sections 51 and an opposite side in contact with an end of bronze sleeve 54. Thrust washers 91 rotate in unison with bronze sleeve 54, rotor sections 51 and shaft 50.

Figure 8:
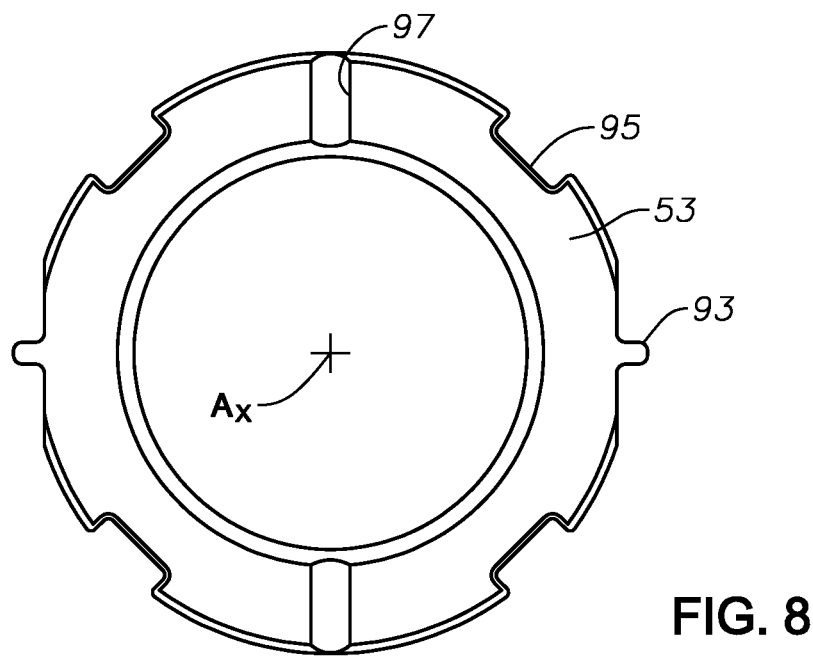
FIG. 8 is a top view of the one of the rotor bearings of the motor of FIG. 2, shown removed from the motor.

Bearing 53 has ribs 93 on opposite sides as shown in FIG. 8 that project radially outward to engage the two grooves 48 (FIG. 3) in stator central opening 47. The engagement of ribs 93 prevents rotation of bearing 53 relative to stator 41 (FIG. 1). In this example bearing 53 and ribs 93 are integrally formed together from a single monolithic piece of metal.

Bearing 53 optionally includes axially extending channels 95 spaced around its outer diameter. Channels 95 provide pathways for motor lubricant circulation between bearings 53 and stator 41 (FIG. 1). Radial flow channels 97 are shown formed on the upper and lower ends of bearing 53. Bearing 53 optionally is equipped with circumferential channels or axial channels (not shown) inside its inner diameter to facilitate lubricant flow. The cylindrical outer surface between channels 95 is in a close fit with the inner sidewall of stator central opening 47 (FIG. 3), but the small clearance is enough to allow rotor sections 51 to slide into stator central opening 47 during assembly.

Figure 11:
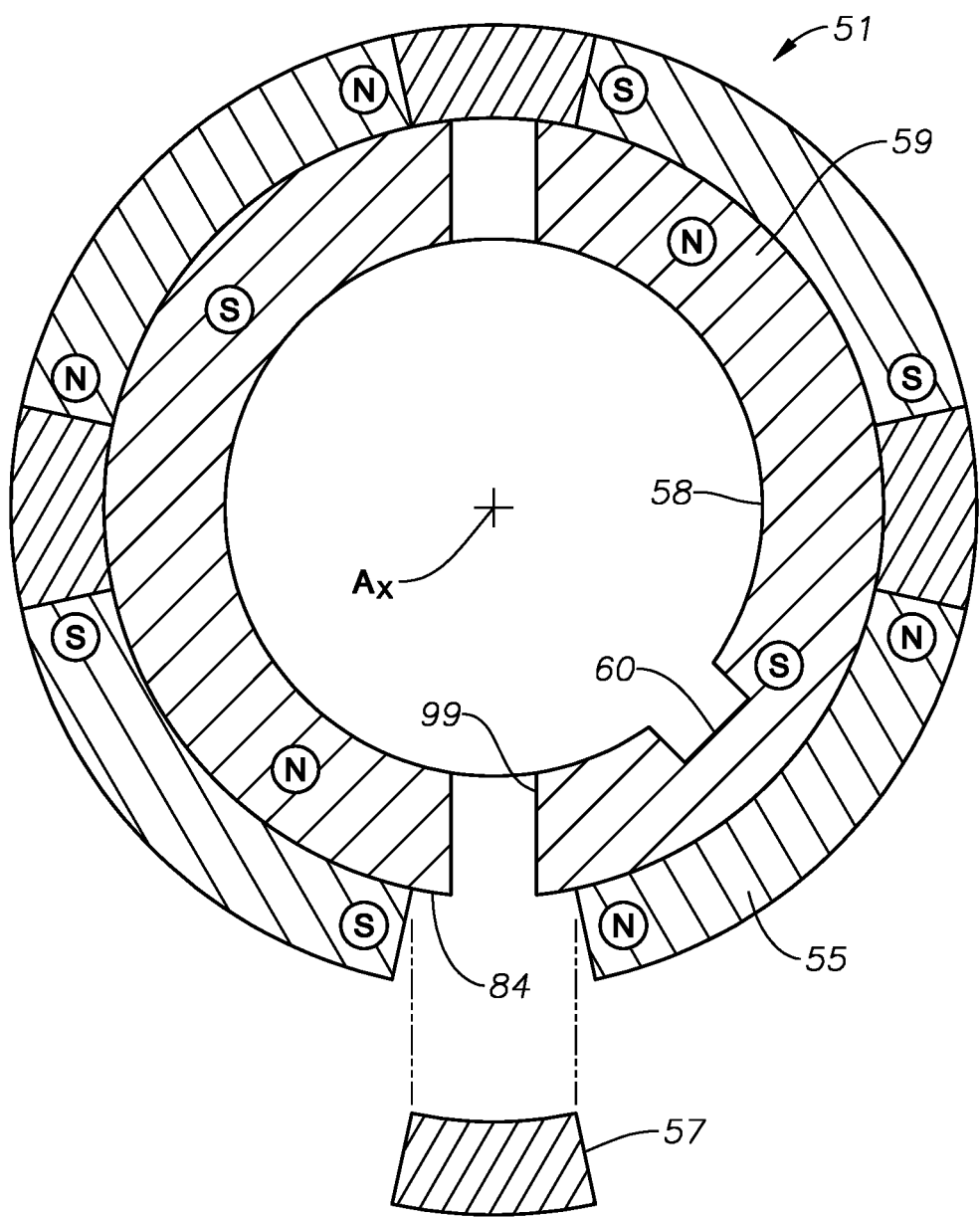
FIG. 11 is a transverse sectional view of the magnets being attached to the core.

FIGS. 9-11 illustrate a non-limiting example method for assembling each rotor section 51. As mentioned above, in examples the angular distances from each magnet 55, 57 to key groove 60 are the same in each of the rotor sections. In this example, the orientations are matched by forming a set of apertures 99 (four shown) through the sidewall of core 59. Apertures 99 are on an axial line parallel with axis $A_x$. Apertures 99 are a selected angular distance, such as 45 degrees, from key slot 60 (FIG. 11). In alternatives, another set of apertures 99 is on the opposite side of core 59 (FIG. 11) to provide balance of core 59 at high rotational speed.

A template or guide bar 101 attaches to core 59 for the purpose of securing magnets 55, 57 at the desired orientations. In the example shown guide bar 101 has an axial length equal to the distance between end rings 85 and has holes 103 that selectively radially align with apertures 99. Guide bar 101 has a circumferential dimension or width between opposing lateral side edges that is the same as orthogonal magnets 57 in this example. An embodiment of guide bar 101 has an inner wall that is curved (partly cylindrical) for abutment with a portion of the outer cylindrical surface 84 of core 59. Alternately, the circumferential dimension of guide bar 101 matches that of the pole magnets 55. Fasteners, such as pins 105, insert through guide bar holes 103 and into apertures 99 to temporarily secure guide bar 101 to core 59, as shown in FIG. 10.

In one embodiment, an adhesive or epoxy is coated either on inner sides 63, 73 (FIG. 4) of magnets 55, 57, on outer surface 84 of core 59, or both. Magnets 55, 57 in this embodiment have shorter axial lengths that guide bar 101. Four circumferential rows of the magnets 55, 57 are shown stacked on each other in between end rings 85 in this example, and in examples the number is different. In this example of assembly, a technician abuts the side edge of a first magnet, shown to be a pole magnet 55, against a side edge of guide bar 101 and against outer surface 84 of core 59 so that the epoxy secures the first magnet 55 in place. The technician then presses the other magnets 55, 57 in the first circumferential row against outer surface 84 of core 59. The last magnet 55 in the top row is illustrated spaced radially from core 59 and as it is being placed on and adhered to core 59. The technician repeats this process for the other three circumferential rows.

In a subsequent step of this example of assembly and as illustrated in FIG. 11, technician then removes guide bar 101 from core 59, which leaves an open space or axial column between adjacent pole magnets 55. The technician then inserts into and adheres the four remaining orthogonal magnets 57 to outer surface 84 of core 59 in the open space.

Outer sleeve 61 (FIG. 4) is then placed over the array of magnets 55, 57 and secured. In one embodiment, outer sleeve 61 is heated, inserted over, then allowed to cool to heat shrink outer sleeve 61 to magnets 55, 57 and end rings 85.

During an example of operation of ESP 15 (FIG. 1), three phase AC power is supplied to stator windings 45. A variable speed drive at the surface of the well 11 optionally varies the frequency of the power for startup and other reasons. The current in windings 45 (FIG. 3) results in magnetic flux being created that revolves around stator 41. The revolving electromagnetic field interacts with magnetic flux of pole magnets 55, causing rotor sections 51 and shaft 50 to rotate. Orthogonal magnets 57 increase the overall magnetic flux linked with windings 45 by redirecting or adjusting the magnetic flux near pole magnet side edges 67, 69. The redirection of magnetic flux results in improved torque capacity and a higher power factor for motor 19.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An electrical submersible pump motor, comprising:
   a stator having a stack of laminations with windings extending through slots in the laminations, the stator having a central opening with a longitudinal axis;
   a shaft extending through the central opening; and
   rotor sections mounted along a length of the shaft for rotating the shaft, each of the rotor sections comprising:
      a tubular core having a bore keyed to the shaft for rotation in unison, the bore having undercut sections at each end of the core separated by an intermediate bore section of smaller diameter than the undercut bore sections,
      the tubular core having an outer surface with an end ring section at each of the ends separated by an outer surface intermediate section,
      a pair of end rings, each of the end rings having an initial inner diameter greater than an outer diameter of the end ring sections and being shrunk fit onto one of the end ring sections, and
      an array of magnets mounted to the outer surface intermediate section between the end rings.

2. The motor according to claim 1, wherein the outer diameter of each of the end ring sections is smaller than an outer diameter of the outer surface intermediate section.

3. The motor according to claim 2, wherein, the diameter of each of the undercut bore sections decreases from an initial diameter to a final diameter when the end rings are shrunk fit onto the end sections; and the final diameter is not less than the diameter of the intermediate bore section.

4. The motor according to claim 1, wherein an axial dimension of each of the undercut sections is the same as an axial dimension of each of the end ring sections.

5. The motor according to claim 1, further comprising first and second outer sleeves that enclose the array of magnets and that have axial lengths less than an axial length of the array of magnets, and wherein the outer sleeves are made of titanium.

6. The motor according to claim 1, wherein the shaft and the core are formed of a magnetic steel.

7. The motor according to claim 1, wherein a ratio of a length of each of the rotors divided by a diameter of the shaft is not greater than 12.

8. The motor according to claim 1, further comprising, an axially extending groove in the central opening, and a bearing located between adjacent ends of two of the rotor sections, the bearing having a rib integrally formed thereon and that projects radially outward into the groove, so that the bearing is rotationally coupled with the stator.

9. An electrical submersible pump motor comprising:
   a stator having windings;
   a shaft extending through an axial opening in the stator; and
   a rotor that is disposed inside the axial opening, the rotor comprising:
      an axial bore that receives the shaft,
      an annular core,
      magnets strategically arranged on the core,
      end rings that are shrunk fit onto opposing outer ends of the core and undercuts defined by an increase in inner diameter of the axial bore at the opposing ends, so that when the end rings are shrunk fit onto the core, an inner wall of the core remains spaced away from the shaft; and
      coaxially disposed sleeves circumscribing and shrunk fit around the magnets so that the magnets are radially compressed between the core and the sleeves.

10. The motor of claim 9, wherein the sleeves have a combined axial length that is about the same as an axial length of the magnets, and wherein the magnets are elongate members that extend substantially parallel with an axis of the core and each circumscribe a portion of the circumference of the core.

11. The motor of claim 10, wherein side edges of adjacent magnets are in abutting contact.

12. The motor of claim 11, further comprising lubricant flow passages formed axially and radially in the bearing.

13. The motor of claim 11, further comprising apertures formed radially through the rotor which selectively receive pins for temporarily securing an elongated guide bar to the rotor, the guide bar having a width that is substantially the same as a width of a row of magnets that extend axially along the core, the guide bar selectively mounted onto the core during assembly of the core for placement of another row of magnets that are arranged adjacent to the row of magnets.

14. The motor of claim 9, wherein defined between axial ends of adjacent sleeves is an interface that circumscribes each of the magnets.

15. The motor of claim 9, wherein the shaft comprises material that is magnetic.

\* \* \* \* \*